(12) United States Patent
Aikoh

(10) Patent No.: US 10,027,935 B2
(45) Date of Patent: Jul. 17, 2018

(54) LIQUID CRYSTAL DISPLAY UNIT AND PROJECTION-TYPE DISPLAY DEVICE

(71) Applicant: Sony Corporation, Tokyo (JP)

(72) Inventor: Yoshihisa Aikoh, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 152 days.

(21) Appl. No.: 15/241,272

(22) Filed: Aug. 19, 2016

(65) Prior Publication Data

US 2016/0360168 A1 Dec. 8, 2016

Related U.S. Application Data

(63) Continuation of application No. 13/595,901, filed on Aug. 27, 2012, now Pat. No. 9,470,918.

(30) Foreign Application Priority Data

Sep. 2, 2011 (JP) .................. 2011-191218

(51) Int. Cl.
| | |
|---|---|
| G02F 1/1335 | (2006.01) |
| H04N 9/31 | (2006.01) |
| G02F 1/1333 | (2006.01) |
| G02F 1/13363 | (2006.01) |
| G03B 21/00 | (2006.01) |

(52) U.S. Cl.
CPC ....... *H04N 9/3167* (2013.01); *G02F 1/13363* (2013.01); *G02F 1/133308* (2013.01); *G02F 1/133512* (2013.01); *H04N 9/3108* (2013.01); *H04N 9/3152* (2013.01); *G03B 21/006* (2013.01)

(58) Field of Classification Search
CPC .. H04N 9/3167; H04N 9/3108; H04N 9/3152; G03B 21/006; G02F 1/133308; G02F 1/133512; G02F 1/13363

USPC ................. 349/110–111, 117–121
See application file for complete search history.

(56) References Cited

U.S. PATENT DOCUMENTS

| | | | |
|---|---|---|---|
| 5,936,600 | A | 8/1999 | Ohashi et al. |
| 2005/0146689 | A1 | 7/2005 | Iechika |
| 2010/0091201 | A1* | 4/2010 | Koyama ........... G02F 1/133308 349/5 |

FOREIGN PATENT DOCUMENTS

| | | |
|---|---|---|
| CN | 1474228 | 2/2004 |
| CN | 1873521 | 12/2006 |
| JP | 2003177382 | 6/2003 |
| JP | 2007-108735 | 4/2007 |
| JP | 2007108735 | 4/2007 |

OTHER PUBLICATIONS

Chinese Office Action dated Oct. 17, 2017.

* cited by examiner

*Primary Examiner* — Charles Chang
(74) *Attorney, Agent, or Firm* — Haug Partners LLP; William S. Frommer

(57) ABSTRACT

There is provided a liquid crystal display unit including a liquid crystal panel for modulating light; a light shielding plate for controlling light not to be incident on areas other than an effective pixel area of the liquid crystal panel; an optical compensation element arranged at sides on which the light is incident in the liquid crystal panel and the light shielding plate; and an optical compensation element holder for holding the optical compensation element to be spaced from the light shielding plate and not to contact other members.

20 Claims, 4 Drawing Sheets

LIQUID CRYSTAL DISPLAY UNIT AND PROJECTION-TYPE DISPLAY DEVICE

This is a continuation of application Ser. No. 13/595,901, filed Aug. 27, 2012, which is entitled to the priority filing date of Japanese application 2011-191218, filed on Sep. 2, 2011, the entirety of which is incorporated herein by reference.

BACKGROUND

The present disclosure relates to a liquid crystal display unit for modulating light into light corresponding to image information, and a projection-type display device including the liquid crystal display unit.

A projection-type display device such as a liquid crystal projector or a CRT projector includes a light source, and a liquid crystal display unit for modulating light from the light source. A liquid crystal panel for modulating light into light corresponding to image information, and an optical compensation element for adjusting a phase or a polarization state of light are provided in the liquid crystal display unit. Further, the liquid crystal display unit includes a light shielding plate for controlling light so that light is not incident on areas other than an effective pixel area of the liquid crystal panel.

However, a temperature of the light shielding plate rises due to unnecessary light that does not contribute to projection. As described in Japanese Patent Application Laid-Open No. 2007-108735, a liquid crystal display unit in which a plurality of light shielding plates are provided in order to shield light incident on areas other than the effective pixel area of the liquid crystal panel, as well as unnecessary light that does not contribute to projection has been proposed.

SUMMARY

However, in technology disclosed in Japanese Patent Application Laid-Open No. 2007-108735, all members such as a first light shielding plate, a second light shielding plate, and a packing are formed substantially in a flat-plate shape, and all members, including an optical compensation element, are overlaid. Accordingly, the light shielding plate or the packing surface-contacts a polarization plate that is the optical compensation element. Because of this, heat of the first light shielding plate and the second light shielding plate or the packing is delivered to the optical compensation element.

Further, a packing for a dust-proof solution is adhered to the optical compensation element. Because of this, force generated when the packing is fixed is applied to the optical compensation element. Accordingly, when high contrast is desired to be realized using the technology disclosed in Japanese Patent Application Laid-Open No. 2007-108735, heat or force, which had not been problematic in the past, may be delivered to the optical compensation element and the optical compensation element may be distorted. As a result, the optical compensation element causes birefringence and unevenness of luminance is generated on the projection screen.

In view of the circumstances described above, it is desirable to provide a liquid crystal display unit and a projection-type display device capable of preventing external heat or force from being delivered to an optical compensation element and preventing unevenness of luminance from being generated on a projection screen.

The liquid crystal display unit of the present disclosure includes a liquid crystal panel for modulating light, a light shielding plate, an optical compensation element, and an optical compensation element holder.

The light shielding plate controls light not to be incident on areas other than an effective pixel area of the liquid crystal panel. The optical compensation element is arranged at sides on which the light is incident in the liquid crystal panel and the light shielding plate. The optical compensation element holder holds the optical compensation element to be spaced from the light shielding plate and not to contact other members.

Further, the projection-type display device of the present disclosure includes a light source for outputting light, and a liquid crystal display unit for modulating the light output from the light source.

The liquid crystal display unit includes a liquid crystal panel for modulating light, a light shielding plate, an optical compensation element, and an optical compensation element holder.

The light shielding plate controls light not to be incident on areas other than an effective pixel area of the liquid crystal panel. The optical compensation element is arranged at sides on which the light is incident in the liquid crystal panel and the light shielding plate. The optical compensation element holder holds the optical compensation element to be spaced from the light shielding plate and not to contact other members.

According to the liquid crystal display panel and the projection-type display device of the present disclosure, the optical compensation element is not brought into contact with other members and is held to be spaced from the light shielding plate. As a result, since external heat or force can be prevented from being delivered to the optical compensation element, it is possible to prevent birefringence from being generated in the optical compensation element due to the heat or the force and to prevent unevenness of luminance from being generated.

DETAILED DESCRIPTION OF THE EMBODIMENTS

Figure 1:
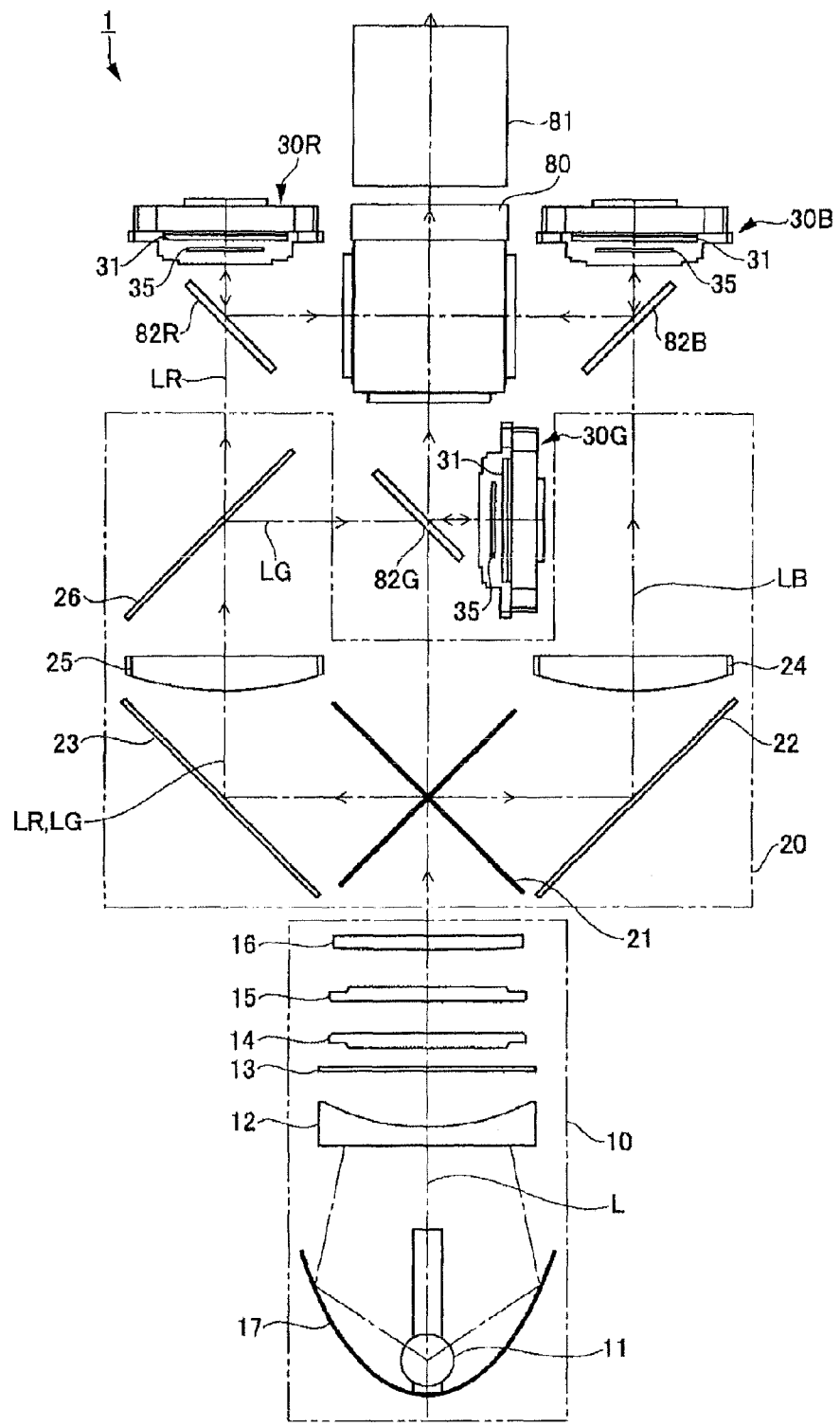
FIG. 1 is an illustrative view showing an optical component of a projection-type display device according to an embodiment of the present disclosure.

Hereinafter, an embodiment of the projection-type display device and the liquid crystal display unit of the present disclosure will be described with reference to FIGS. 1 to 4. Further, in FIGS. 1 to 4, the same reference numerals are assigned to common members. Further, the projection-type display device and the liquid crystal display unit of the present disclosure are not limited to forms that will be described later.

Further, a description will be given in the following order.
1. Schematic Configuration of Projection-type Display Device
2. Configuration of Liquid Crystal Display Unit
3. Method of Assembling Liquid Crystal Display unit
1. Schematic Configuration of Projection-type Display Device First, a schematic configuration of a projection-type display device will be described with reference to FIG. 1.

FIG. 1 is an illustrative view showing an optical component of a projection-type display device.

As shown in FIG. 1, a projection-type display device 1 includes an illumination optical component 10 for outputting a light L, a spectroscopic optical component 20 for dividing the light L output from the illumination optical component 10, and three liquid crystal display units 30R, 30G and 30B for modulating the light L.

Further, the projection-type display device 1 includes a light synthesis unit 80 for synthesizing respective lights L modulated by the three liquid crystal display units 30R, 30G and 30B, and a projection lens system 81 for projecting the light L synthesized by the light synthesis unit 80. Further, reflection-type polarization elements 82R, 82G and 82B are provided between the spectroscopic optical component 20 and the three liquid crystal display units 30R, 30G and 30B.

[Illumination Optical Component]

The illumination optical component 10 includes a light source 11, a concave lens 12 for adjusting light L output from the light source 11 into substantially parallel light L, a UV cut filter 13, a first fly lens array 14, a second fly lens array 15, and a condenser lens 16.

For example, a xenon lamp, a halogen lamp, an ultra-high pressure mercury lamp, or the like is used as the light source 11. The reflector 17 for reflecting the light L output from the light source 11 is provided around the light source 11. The light L reflected by the reflector 17 is output to the concave lens 12. The light transmitted through the concave lens 12 is output to the UV cut filter 13 and ultraviolet light is eliminated by the UV cut filter 13.

The light L transmitted through the UV cut filter 13 is incident on the first fly lens array 14 and the second fly lens array 15. As the light L is transmitted through the first fly lens array 14 and the second fly lens array 15, unevenness of luminance of the light L is reduced. The light L transmitted through the first fly lens array 14 and the second fly lens array 15 is incident on the condenser lens 16. The light L incident on the condenser lens 16 is condensed and output to the spectroscopic optical component 20.

[Spectroscopic Optical Component]

The spectroscopic optical component 20 includes a first dichroic mirror 21, two reflection mirrors 22 and 23, two condenser lenses 24 and 25, and a second dichroic mirror 26. The first dichroic mirror 21 divides the light L incident from the illumination optical component 10 into a blue light LB at a long wavelength side and a red light LR and a green light LG at a short wavelength side.

The blue light LB divided by the first dichroic mirror 21 is reflected by the first reflection mirror 22 and incident on the first condenser lens 24. Also, the blue light LB condensed by the first condenser lens 24 is incident on the first liquid crystal display unit 30B via the first reflection-type polarization element 82B.

Further, the red light LR and the green light LG divided by the first dichroic mirror 21 are reflected by the second reflection mirror 23 and incident on the second condenser lens 25. Also, the red light LR and the green light LG are condensed by the second condenser lens 25 and output to the second dichroic mirror 26.

The second dichroic mirror 26 divides the red light LR and the green light LG into the green light LG at a short wavelength side and the red light LR at a long wavelength side. The divided red light LR is incident on the second liquid crystal display unit 30R via the second reflection-type polarization element 82R, and the green light LG is incident on the third liquid crystal display unit 30G via the third reflection-type polarization element 82G.

Further, a detailed configuration of the liquid crystal display units 30R, 30G and 30B will be described later.

The lights LR, LG and LB incident on the liquid crystal display units 30R, 30G and 30B are modulated into image light having intensity distributions according to respective image information by the liquid crystal panels 31 provided in the liquid crystal display units 30R, 30G and 30B and reflected. Also, the three modulated image lights are reflected by the reflection-type polarization elements 82R, 82G and 82B and incident on the light synthesis unit 80.

[Light Synthesis Unit]

The light synthesis unit 80 includes, for example, a dichroic prism. The light synthesis unit 80 synthesizes the three lights modulated by the three liquid crystal display units 30R, 30G and 30B on the same light path and outputs the resultant light to the projection lens system 81. Also, the synthesized light is expanded and projected by the projection lens system 81 on a screen that is not shown.

2. Configuration of Liquid Crystal Display Unit

Next, a detailed configuration of the liquid crystal display units 30R, 30G and 30B will be described with reference to FIGS. 2 to 4.

Figure 2:
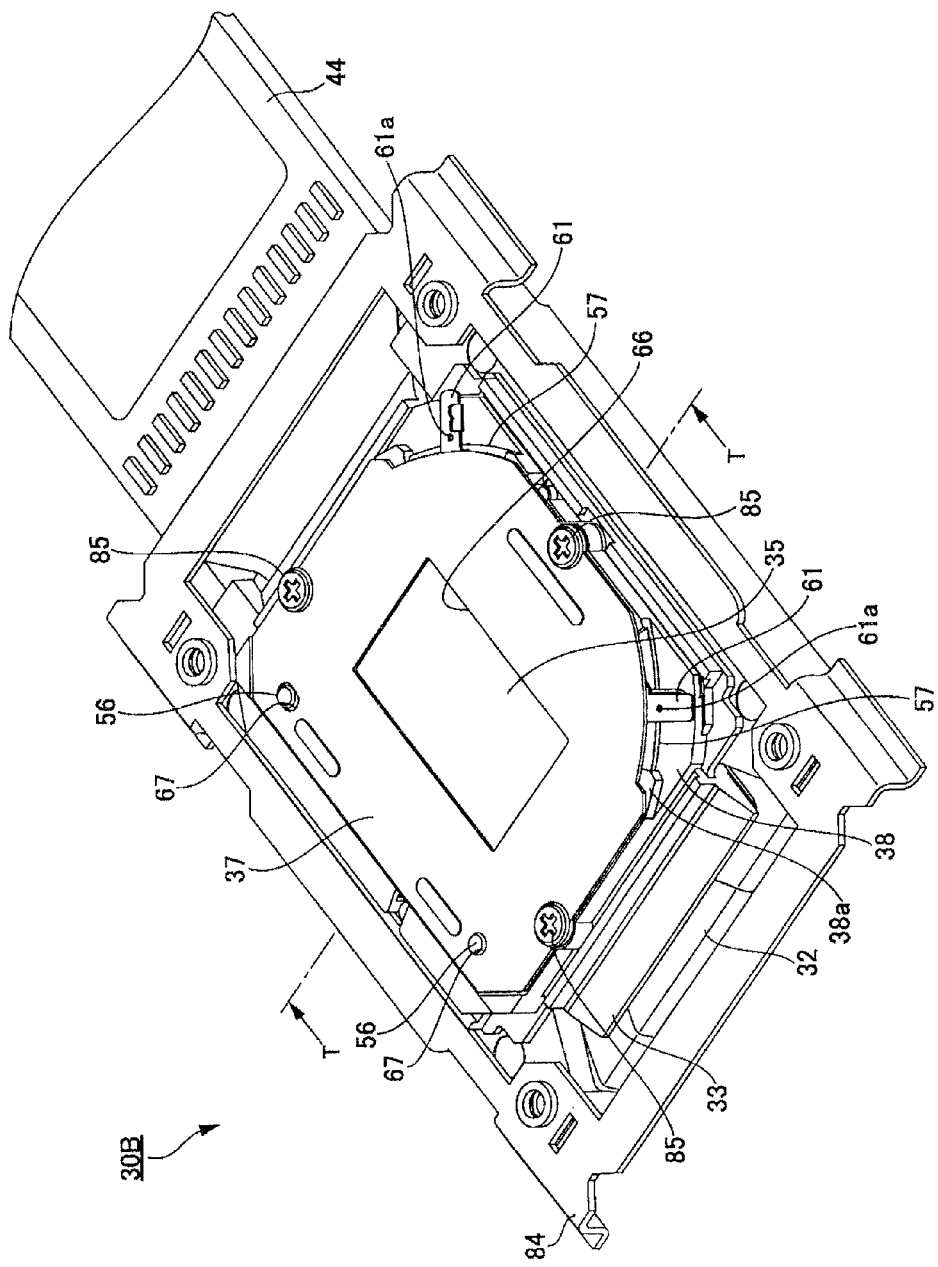
FIG. 2 is a perspective view showing a liquid crystal display unit provided in a projection-type display device according to an embodiment of the present disclosure.
Figure 3:
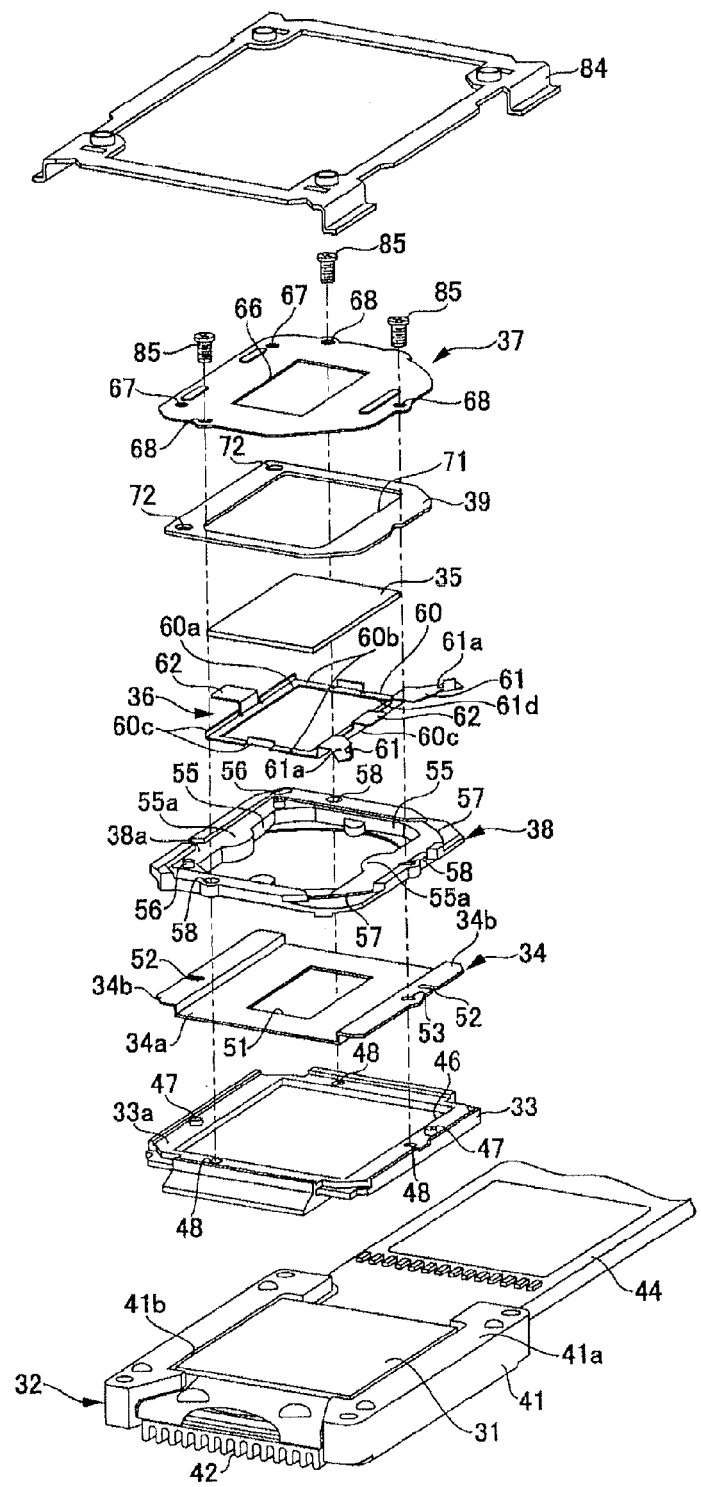
FIG. 3 is an exploded perspective view showing the liquid crystal display unit provided in the projection-type display device according to an embodiment of the present disclosure.

FIG. 2 is a perspective view showing the liquid crystal display unit, and FIG. 3 is an exploded perspective view showing the liquid crystal display unit. FIG. 4 is a cross-sectional view of the liquid crystal display unit taken along line T-T shown in FIG. 2.

Further, since the three liquid crystal display units 30R, 30G and 30B have the same configuration except for the liquid crystal panel 31, the first liquid crystal display unit 30B will be described herein.

As shown in FIGS. 2 and 3, the first liquid crystal display unit 30B includes a panel package 32 including the liquid crystal panel 31, a panel cover 33, a light shielding plate 34, an optical compensation element 35, and an optical compensation element holder 36. Further, the first liquid crystal display unit 30B includes a pre-light-shielding plate 37, a pre-light-shielding plate holder 38, and a packing 39 for dust proofing.

The first liquid crystal display unit 30B is mounted by a mounting member 84 on a frame (not shown) in which the first reflection-type polarization element 82B (see FIG. 1) is provided.

[Panel Package]

The panel package 32 includes the liquid crystal panel 31, a base member 41 on which the liquid crystal panel 31 is mounted, and a heat sink 42. As shown in FIG. 4, a concave portion 41b is formed in one surface 41a of the base member 41. The liquid crystal panel 31 is mounted on the concave portion 41b. Further, the heat sink 42 is provided on the other surface opposite to the surface 41a on which the liquid crystal panel 31 is mounted in the base member 41.

As shown in FIG. 3, the flexible wiring board 44 is connected to the liquid crystal panel 31. Also, the liquid crystal panel 31 receives an image signal from a control unit (not shown) via the flexible wiring board 44. The liquid crystal panel 31 used in the projection-type display device 1 of the present example is a reflection-type liquid crystal panel. The liquid crystal panel 31 changes an array of liquid crystal molecules according to the image signal input from the control unit, divides the light into the color light beams R, G and B, modulates the color light beams, and reflects the color light beams to the reflection-type polarization elements 82R, 82G and 82B.

[Panel Cover]

Figure 4:
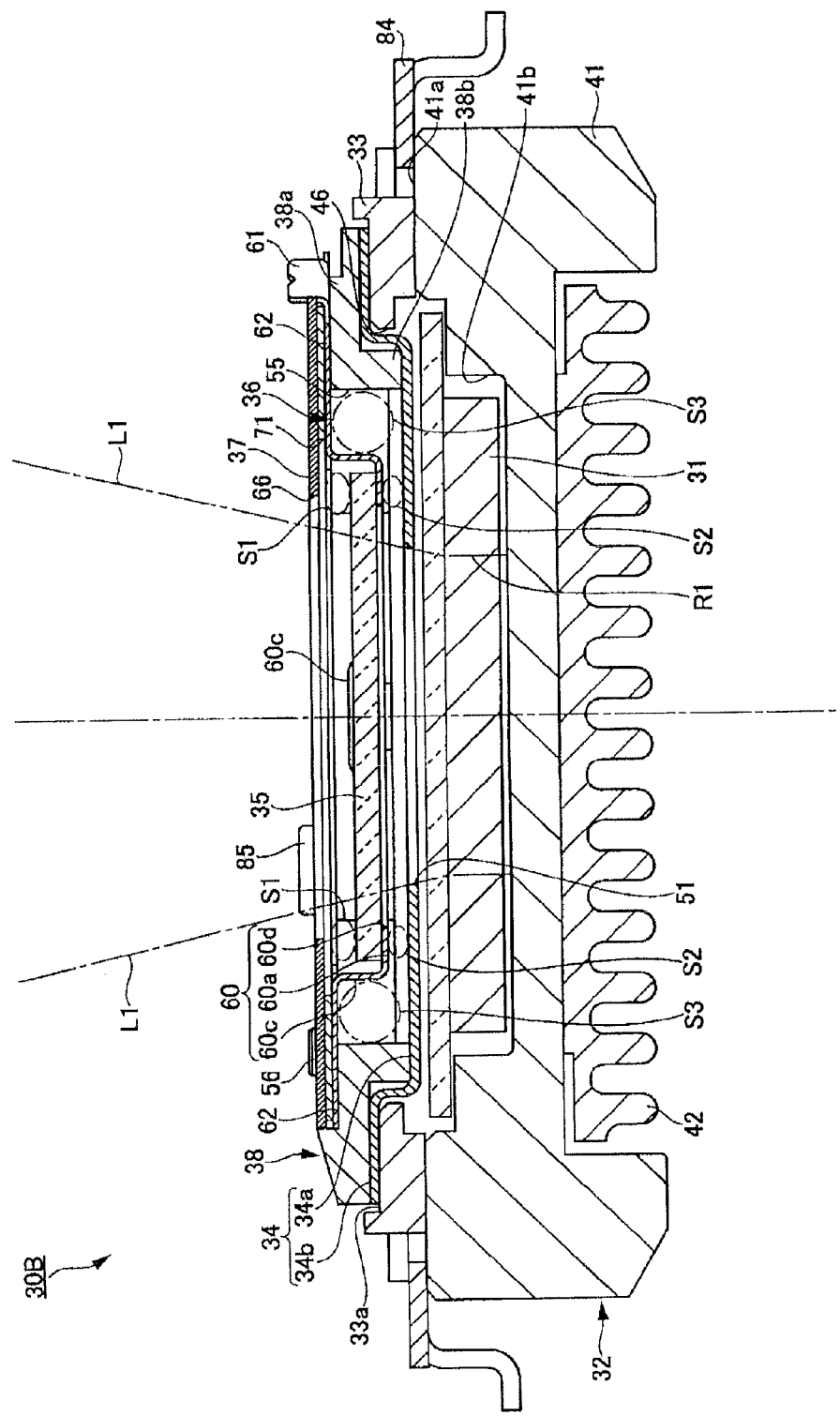
FIG. 4 is a cross-sectional view of the liquid crystal display unit taken along line T-T shown in FIG. 2.

As shown in FIG. 4, a panel cover 33 is attached to the one surface 41a of the base member 41 in the panel package 32. As shown in FIG. 3, the panel cover 33 is formed in a substantially square frame. An opening 46 opened in a substantially square shape is provided in the panel cover 33. A light shielding plate mounting surface 33a is formed in a rim portion of the opening 46 in the panel cover 33.

The light shielding plate mounting surface 33a is configured as a stepped surface recessed by a thickness of a light shielding plate 34 that will be described later from an outer periphery of the panel cover 33. Protrusions 47 for positioning and fixing holes 48 in which fixing screws 85 are screwed are formed in the light shielding plate mounting surface 33a. Also, the light shielding plate 34 is mounted on the light shielding plate mounting surface 33a, as shown in FIG. 4.

[Light Shielding Plate]

The light shielding plate 34 includes a main surface portion 34a formed in a substantially rectangular shape, and two stepped surface portions 34b. The light shielding plate 34 is formed, for example, by bending both ends in a longitudinal direction of a substantially flat-plate-shaped member.

The main surface portion 34a is set to have substantially the same size as an opening area of the opening 46 of the panel cover 33. An opening window 51 is opened in a substantially square shape in the main surface portion 34a. An opening area of the opening window 51 is set to be substantially the same as or slightly larger than an effective pixel area R1 in the liquid crystal panel 31. Also, as shown in FIG. 4, the light shielding plate 34 controls light incident on areas other than the effective pixel area R1 of the liquid crystal panel 31, and passes only the effective light L1 to the liquid crystal panel 31 via the opening window 51.

Further, the stepped surface portions 34b are continuously formed in both of the ends of the longitudinal direction of the main surface portion 34a.

As shown in FIG. 4, the stepped surface portions 34b are stepped surfaces that are bent twice at substantially right angles from both of the ends of the longitudinal direction of the main surface portion 34a. Because of this, the main surface portion 34a becomes a concave portion recessed from the stepped surface portions 34b to the panel cover 33. As shown in FIG. 3, notches 52 for positioning and an insertion hole 53 into which the fixing screw 85 is inserted are provided in the stepped surface portion 34b.

Further, the stepped surface portions 34b are mounted on the light shielding plate mounting surface 33a of the panel cover 33. Also, the main surface portion 34a is inserted into the opening 46 of the panel cover 33. In this case, protrusions 47 provided in the light shielding plate mounting surface 33a of the panel cover 33 are inserted into the notches 52 such that the light shielding plate 34 is positioned with respect to the panel cover 33.

As shown in FIG. 4, the pre-light-shielding plate holder 38 is arranged on the panel cover 33 and the light shielding plate 34 so that the stepped surface portions 34b of the light shielding plate 34 are sandwiched between the pre-light-shielding plate holder 38 and the panel cover 33.

[Pre-Light-Shielding Plate Holder]

As shown in FIG. 3, the pre-light-shielding plate holder 38 is configured as a substantially square frame. The pre-light-shielding plate holder 38 includes a substantially rectangular mounting portion 38a, and a bulging portion 38b protruding in a substantially square shape from one surface opposite to the light shielding plate 34 in the mounting portion 38a (see FIG. 4).

In the mounting portion 38a, convex portions 56 and guide portions 57 for positioning are formed in the other surface at an opposite side of the bulging portion 38b. The convex portions 56 protrude substantially vertically from the other surface of the mounting portion 38a. The guide portions 57 are provided in both ends at one side in a transverse direction of the mounting portion 38a. The guide portions 57 are formed by cutting off corners of the mounting portion 38a to be in a substantially arcuate shape. Further, insertion holes 58 into which the fixing screws 85 are inserted are provided in an outer edge of the mounting portion 38a.

As shown in FIG. 4, the bulging portions 38b get stuck in a space in a substantially square shape formed by the main surface portion 34a and the two stepped surface portions 34b in the light shielding plate 34.

Further, a pre-opening window 55 continuously opened over the bulging portion 38b from the mounting portion 38a is formed in the pre-light-shielding plate holder 38. The pre-opening window 55 is opened in a substantially square shape. Further, as shown in FIG. 4, a length from the mounting surface of the mounting portion 38a to an end surface of a protruding side of the bulging portion 38b is set to greater than a thickness of the optical compensation element 35 that will be described later. Because of this, a depth of the opening of the pre-opening window 55 is greater than a thickness of the optical compensation element 35. Further, as shown in FIG. 3, support portions 55a for supporting the optical compensation element holder 36, which will be described later, are provided on a wall surface of the pre-opening window 55.

As the light shielding plate 34 is sandwiched between the panel cover 33 and the pre-light-shielding plate holder 38, heat accumulated on the light shielding plate 34 can be dissipated from both of the surfaces of the light shielding plate 34 to the panel cover 33 and the pre-light-shielding plate holder 38. Accordingly, it is possible to reduce the heat delivered from the light shielding plate 34 to the optical compensation element 35 that will be described later.

Further, for example, a material having high heat dissipation, such as an aluminum alloy, is used as a material of the panel cover 33 and the pre-light-shielding plate holder 38, thereby improving a heat dissipation effect. Further, it is understood that various metals other than the aluminum alloy may be used as the material of the panel cover 33 and the pre-light-shielding plate holder 38. An engineering plastic rather than a metal may be used.

[Optical Compensation Element]

The optical compensation element 35 is a substantially flat-plate-shaped member, which adjusts a phase difference or a polarization state of light. The optical compensation element 35 is held in the optical compensation element holder 36.

[Optical Compensation Element Holder]

The optical compensation element holder 36 is formed by bending a thin flat-plate-shaped member. The optical compensation element holder 36 includes a holding portion 60 for holding the optical compensation element 35, a lever 61, and support pieces 62.

The holding portion 60 is formed as a substantially rectangular frame, and has two long side portions 60a and two short side portions 60b. The holding portion 60 forms a substantially rectangular opening 60d using the two long side portions 60a and the two short side portions 60b. A plurality of side wall portions 60c are provided in the long side portions 60a and the short side portions 60b. The side wall portion 60c is continuously formed at a substantially right angle from the long side portion 60a and the short side portion 60b. A height of the side wall portion 60c is set to be greater than a thickness of the optical compensation element 35 and to be smaller than the depth of the opening of the pre-opening window 55 of the pre-light-shielding plate holder 38. Also, the optical compensation element 35 is mounted on the two long side portions 60a and the two short side portions 60b.

Further, the lever 61 and the support pieces 62 are continuously provided in the side wall portions 60c of the long side portions 60a of the holding portion 60. The lever 61 is formed in a tongue piece shape, and a guide projection 61a is provided in the lever 61. The guide projection 61a provided in the lever 61 is slidably in contact with a sidewall of the guide portion 57 of the pre-light-shielding plate holder 38. The optical compensation element holder 36 can be rotated about an optical axis by manipulating the lever 61. Accordingly, an angle of the optical axis rotation of the optical compensation element 35 held in the optical compensation element holder 36 with respect to the liquid crystal panel 31 can be adjusted.

The support pieces 62 are formed in tongue shapes. The support pieces 62 are continuous at a substantially right angle in an opposite direction of the long side portion 60a from the side wall portion 60c. Also, the support pieces 62 are mounted on the support portion 55a and the mounting portion 38a provided in the pre-light-shielding plate holder 38.

Since the support pieces 62 are bent in an offset manner with respect to the long side portion 60a, the surface on which the optical compensation element 35 is mounted and the surface supported by the pre-light-shielding plate holder 38 are not arranged on the same plane. Specifically, the surface on which the optical compensation element 35 is mounted is positioned toward the liquid crystal panel 31 as compared to the surface supported by the pre-light-shielding plate holder 38.

Further, since a height of the side wall portion 60c is set to be greater than a thickness of the optical compensation element 35, the support pieces 62 continuous from the side wall portion 60c are arranged in a position estranged from the liquid crystal panel 31 as compared to a surface of the optical compensation element 35 on which light from the light source is incident. Because of this, when the support pieces 62 are mounted on the support portion 55a of the pre-light-shielding plate holder 38, the holding portion 60 is fitted into the pre-opening window 55 of the pre-light-shielding plate holder 38.

Further, a packing 39 and a pre-light-shielding plate 37 are mounted on the mounting portion 38a of the pre-light-shielding plate holder 38.

[Pre-Light-Shielding Plate]

The pre-light-shielding plate 37 is a member formed in a substantially flat plate shape, and has a pre-opening 66 opened in a substantially square shape. An opening area of the pre-opening 66 is set to be larger than the opening 46 provided in light shielding plate 34. Further, through-holes 67 for a positioning purpose fitted to the convex portions 56 provided in the pre-light-shielding plate holder 38, and insertion holes 68 into which the fixing screws 85 are inserted are provided in the pre-light-shielding plate 37.

Unnecessary light that does not contribute to projection is shielded by the pre-light-shielding plate 37. Accordingly, since the unnecessary light is not irradiated to the light shielding plate 34, it is possible to suppress the temperature of the light shielding plate 34 from rising. Further, the packing 39 is arranged between the pre-light-shielding plate 37 and the mounting portion 38a of the pre-light-shielding plate holder 38.

[Packing]

The packing 39 is formed of a flat-plate-shaped rubber member. An opening 71 opened to be larger than the optical compensation element 35 is provided in the packing 39. Also, as shown in FIG. 4, when the packing 39 is mounted on the pre-light-shielding plate holder 38, the packing 39 does not contact the optical compensation element 35 held in the optical compensation element holder 36. Further, as shown in FIG. 3, through-holes 72 for positioning to be fitted to the convex portions 56 provided in the pre-light-shielding plate holder 38 are provided in the packing 39.

As shown in FIG. 4, the packing 39 is interposed between the pre-light-shielding plate holder 38 and the pre-light-shielding plate 37, and seals spaces formed by the light shielding plate 34 and the pre-light-shielding plate 37 and the pre-opening window 55 of the pre-light-shielding plate holder 38. Accordingly, it is possible to prevent, for example, external motes or dust from intruding into the space formed in the pre-light-shielding plate 37 and the light shielding plate 34. Further, since the packing 39 does not contact the optical compensation element 35, force generated when the packing 39 is fixed is not delivered to the optical compensation element 35 even when the packing 39 is firmly fixed.

3. Method of Assembling Liquid Crystal Display Unit

Next, methods of assembling the liquid crystal display units 30R, 30G and 30B having the above configuration will be described.

Further, since the methods of assembling the three liquid crystal display units 30R, 30G and 30B are the same method, the first liquid crystal display unit 30B will be described herein.

First, the panel cover 33 is fixed to the surface 41a of the base member 41 on which the liquid crystal panel 31 has been mounted in advance, using, for example, a fixing method such as adhesion using an adhesive. Next, the stepped surface portion 34b of the light shielding plate 34 is mounted on the light shielding plate mounting surface 33a of the panel cover 33. In this case, the protrusions 47 provided on the light shielding plate mounting surface 33a are inserted into the notches 52 of the light shielding plate 34 to position the light shielding plate 34 with respect to the panel cover 33.

Further, the light shielding plate 34 has an offset-bending structure, and the main surface portion 34a has a shape recessed from the stepped surface portion 34b to the panel cover 33. Because of this, when the stepped surface portions 34b are mounted on the light shielding plate mounting surface 33a, the main surface portion 34a is arranged in the opening 46 of the panel cover 33.

Next, the bulging portions 38b of the pre-light-shielding plate holder 38 are inserted into the space formed by the main surface portion 34a and the two stepped surface portions 34b of the light shielding plate 34 so that the pre-light-shielding plate holder 38 is mounted on the light shielding plate 34. In this case, the stepped surface portions 34b of the light shielding plate 34 are sandwiched between the light shielding plate mounting surface 33a of the panel cover 33 and the mounting portion 38a of the pre-light-shielding plate holder 38. Accordingly, the heat of the light shielding plate 34 can be dissipated to the panel cover 33 and the pre-light-shielding plate holder 38.

Next, the optical compensation element holder 36 that has held the optical compensation element 35 in advance is mounted on the pre-light-shielding plate holder 38. Specifically, the support pieces 62 of the optical compensation element holder 36 are mounted on the support portions 55a provided in the pre-opening window 55 of the pre-light-shielding plate holder 38. In this case, the optical compensation element 35 held in the holding portion 60 of the optical compensation element holder 36 is arranged in the pre-opening window 55 of the pre-light-shielding plate holder 38.

Next, the through-holes 72 of the packing 39 and the through-holes 67 of the pre-light-shielding plate 37 are fitted to the convex portions 56 of the mounting portion 38a of the pre-light-shielding plate holder 38 so that the packing 39 and the pre-light-shielding plate 37 are mounted in that order on the mounting portion 38a of the pre-light-shielding plate holder 38. Next, the fixing screws 85 are inserted into the insertion holes 68, 58 and 53 of the pre-light-shielding plate 37, the pre-light-shielding plate holder 38, and the light shielding plate 34 and screwed to the fixing holes 48 of the panel cover 33. Accordingly, an assembly of the liquid crystal display unit 30B is completed.

Here, the support pieces 62 of the optical compensation element holder 36 and the holding portion 60 on which optical compensation element 35 is mounted have the offset-bent structure, and the surface on which the optical compensation element 35 is mounted is positioned toward the liquid crystal panel 31 as compared to a surface supported by the pre-light-shielding plate holder 38. Accordingly, as shown in FIG. 4, a gap S1 formed of an air layer is formed between the optical compensation element 35 and the packing 39 and the pre-light-shielding plate 37.

Further, the main surface portion 34a and the stepped surface portions 34b of the light shielding plate 34 also have the offset-bent structure, and the main surface portion 34a is arranged toward the liquid crystal panel 31 as compared to the stepped surface portion 34b. Also, a height of the side wall portion 60c of the optical compensation element holder 36 is set to be smaller than a depth of the opening of the pre-opening window 55 of the pre-light-shielding plate holder 38. Because of this, a gap S2 formed of an air layer is formed between the surface on which the optical compensation element 35 is mounted and the light shielding plate 34.

Further, the pre-opening window 55 of the pre-light-shielding plate holder 38 is opened to be sufficiently larger than the holding portion 60 of the optical compensation element holder 36. Because of this, a gap S3 is formed between a sidewall of the pre-opening window 55 and a side wall portion 60c of the holding portion 60.

Accordingly, the optical compensation element 35 does not contact members other than the holding portion 60 of the optical compensation element holder 36. That is, the optical compensation element 35 is held in a suspended state by the optical compensation element holder 36 in the space formed by the light shielding plate 34 and the pre-light-shielding plate 37 and the pre-opening window 55 of the pre-light-shielding plate holder 38.

Accordingly, not only can heat from the light shielding plate 34 or the pre-light-shielding plate 37 be prevented from being delivered to the optical compensation element 35, but also force generated when the packing 39 or other members are fixed is not delivered to the optical compensation element 35. As a result, it is possible to prevent the optical compensation element 35 from being warped or distorted due to external heat or force, thereby preventing unevenness of luminance from being generated and improving contrast of the projected image.

Further, the support pieces 62 of the optical compensation element holder 36 contact the packing 39, but also contact the pre-light-shielding plate holder 38. Accordingly, heat from the packing 39 and the pre-light-shielding plate 37 is dissipated to the pre-light-shielding plate holder 38, thereby preventing heat from being delivered to the optical compensation element 35.

Further, the support pieces 62 that support the optical compensation element holder 36 are formed in the tongue shapes to decrease a contact area with the packing 39 or the pre-light-shielding plate holder 38. Because of this, it is difficult for external heat or force to be delivered to the optical compensation element holder 36.

Further, in the present embodiment, the light shielding plate 34 and the optical compensation element holder 36 have an offset-bent structure, but the present disclosure is not limited thereto. The light shielding plate 34 and the optical compensation element holder 36 may have other shapes as long as the shapes allow the optical compensation element 35 not to contact members other than the holding portion 60 of the optical compensation element holder 36 and to be held in a suspended state in the space formed by the light shielding plate 34 and the pre-light-shielding plate 37.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A liquid crystal display unit comprising:

a liquid crystal panel for modulating light;

a light shielding plate for controlling light not to be incident on areas other than an effective pixel area of the liquid crystal panel;

an optical compensation element arranged at sides on which the light is incident in the liquid crystal panel and the light shielding plate; and an optical compensation element holder for holding the optical compensation element to be spaced from the light shielding plate and not to contact other members.

(2) The liquid crystal display unit according to (1), wherein the light shielding plate includes a main surface portion having an opening window, and stepped surface portions arranged in positions estranged from the liquid crystal panel as compared to the main surface portion to support the main surface portion, and wherein the optical compensation element holder includes a holding portion for holding the optical compensation element, and a support piece arranged in a position estranged from the liquid crystal panel as compared to the main surface portion to support the holding portion.

(3) The liquid crystal display unit according to (1) or (2), further comprising a pre-light-shielding plate provided at a side on which the light is incident in the optical compensation element, wherein the optical compensation element holder holds the optical compensation element in a suspended state in a space formed by the pre-light-shielding plate and the light shielding plate.

(4) The liquid crystal display unit according to (3), further comprising:
a panel cover arranged around the liquid crystal panel to support the light shielding plate; and
a pre-light-shielding plate holder for supporting the pre-light-shielding plate,
wherein the light shielding plate is sandwiched between the panel cover and the pre-light-shielding plate.

(5) The liquid crystal display unit according to (4), wherein
a pre-opening, into which the optical compensation element holder that holds the optical compensation element is fitted with a gap, is provided in the pre-light-shielding plate holder.

(6) The liquid crystal display unit according to (4) or (5), wherein
a packing having an opening opened to be larger than the optical compensation element is provided between the pre-light-shielding plate and the pre-light-shielding plate holder.

(7) The liquid crystal display unit according to any one of (1) to (6), wherein
the optical compensation element holder includes a lever for rotating the optical compensation element about an optical axis.

(8) A projection-type display device comprising:
a light source for outputting light; and
a liquid crystal display unit for modulating the light output from the light source,
wherein the liquid crystal display unit includes
a liquid crystal panel for modulating the light,
a light shielding plate for controlling the light not to be incident on areas other than an effective pixel area of the liquid crystal panel,
an optical compensation element arranged at sides on which the light is incident in the liquid crystal panel and the light shielding plate, and
an optical compensation element holder for holding the optical compensation element to be spaced from the light shielding plate and not to contact other members.

The embodiments of the liquid crystal display unit and the projection-type display device of the present disclosure, including the operation and the effects, have been described above. However, the liquid crystal display unit and the projection-type display device of the present disclosure are not limited to the above-described embodiments and may be changed without departing from the scope and spirit of the present technology defined in the claims.

While the example in which the three liquid crystal display units are provided and light is divided into R, G and B in the above-described projection-type display device has been described, the present technology is not limited thereto. For example, the present technology may be applied to a projection-type display device in which only one liquid crystal display unit is provided and light is not divided into R, G and B.

Further, the present technology may be applied to a liquid crystal display unit including a transmission-type liquid crystal panel.

The present disclosure contains subject matter related to that disclosed in Japanese Priority Patent Application JP 2011-191218 filed in the Japan Patent Office on Sep. 2, 2011, the entire content of which is hereby incorporated by reference.

What is claimed is:

1. A light modulating apparatus comprising:
a light modulator configured to modulate incident light via an incident light path;
a light shielding plate disposed in the incident light path, the light shielding plate having a window corresponding to an effective pixel area of the light modulator,
wherein the incident light which passes through an area of the window is incident on the effective pixel area of the light modulator;
wherein the incident light outside the area of the window is not incident on areas of the light modulator other than the effective pixel area of the light modulator;
an optical compensation element arranged in the incident light path at an incidence side of the incident light of the light shielding plate;
an optical compensation element holder configured to hold the optical compensation element at an area of the optical compensation element that extends outside the area of the window;
wherein the optical compensation element is spaced from the light shielding plate.

2. The light modulating apparatus according to claim 1, wherein the light shielding plate includes a main surface portion and stepped surface portions arranged in positions estranged from the light modulator as compared to the main surface portion to support the main surface portion, and
wherein the optical compensation element holder includes a holding portion for holding the optical compensation element, and a support piece arranged in a position estranged from the light modulator as compared to the main surface portion to support the holding portion.

3. The light modulating apparatus according to claim 1, further comprising a pre-light-shielding plate provided at a side on which the light is incident on the optical compensation element,
wherein the optical compensation element holder is held by the pre-light-shielding plate.

4. The light modulating apparatus according to claim 3, further comprising:
a cover arranged around the light modulator to support the light shielding plate; and
a pre-light-shielding plate holder for supporting the pre-light-shielding plate,
wherein the light shielding plate is sandwiched between the cover and the pre-light-shielding plate holder.

5. The light modulating apparatus according to claim 4, further comprising a packing disposed between the pre-light-shielding plate and the pre-light-shielding plate holder and having an opening larger than the optical compensation element.

6. The light modulating apparatus according to claim 1, wherein
the optical compensation element holder is spaced from the light shielding plate.

7. The light modulating apparatus according to claim 1, wherein
the optical compensation element holder includes a lever for rotating the optical compensation element about an optical axis so as to adjust an angle of the optical compensation element with respect to the light modulator.

8. The light modulating apparatus according to claim 7, wherein
the lever is formed in a tongue shape.

9. The light modulating apparatus according to claim 1, wherein
the light modulator is a liquid crystal panel.
10. The light modulating apparatus according to claim 1, wherein
the light modulator is a reflection-type liquid crystal panel.
11. A projection-type display device comprising:
a light source configured to output an incident light;
a light modulator configured to modulate the incident light via an incident light path;
a light shielding plate disposed in the incident light path, the light shielding plate having a window corresponding to an effective pixel area of the light modulator,
wherein the incident light which passes through an area of the window is incident on the effective pixel area of the light modulator;
wherein the incident light outside the area of the window is not incident on areas of the light modulator other than the effective pixel area of the light modulator;
an optical compensation element arranged in the incident light path at an incidence side of the incident light of the light shielding plate; and
an optical compensation element holder configured to hold the optical compensation element at an area of the optical compensation element that extends outside the area of the window;
wherein the optical compensation element is spaced from the light shielding plate.
12. The projection-type display device according to claim 11,
wherein the light shielding plate includes a main surface portion and stepped surface portions arranged in positions estranged from the light modulator as compared to the main surface portion to support the main surface portion, and
wherein the optical compensation element holder includes a holding portion for holding the optical compensation element, and a support piece arranged in a position estranged from the light modulator as compared to the main surface portion to support the holding portion.
13. The projection-type display device according to claim 11, further comprising a pre-light-shielding plate provided at a side on which the light is incident on the optical compensation element,
wherein the optical compensation element holder is held by the pre-light-shielding plate.
14. The projection-type display device according to claim 13, further comprising:
a cover arranged around the light modulator to support the light shielding plate; and
a pre-light-shielding plate holder for supporting the pre-light-shielding plate,
wherein the light shielding plate is sandwiched between the cover and the pre-light-shielding plate holder.
15. The projection-type display device according to claim 14, further comprising a packing disposed between the pre-light-shielding plate and the pre-light-shielding plate holder and having an opening larger than the optical compensation element.
16. The projection-type display device according to claim 11, wherein
the optical compensation element holder is spaced from the light shielding plate.
17. The projection-type display device according to claim 11, wherein
the optical compensation element holder includes a lever for rotating the optical compensation element about an optical axis so as to adjust an angle of the optical compensation element with respect to the light modulator.
18. The projection-type display device according to claim 17, wherein
the lever is formed in a tongue shape.
19. The projection-type display device according to claim 11, wherein
the light modulator is a liquid crystal panel.
20. The projection-type display device according to claim 11, wherein
the light modulator is a reflection-type liquid crystal panel.

* * * * *